April 21, 1931.  C. S. SNAVELY ET AL  1,801,291

METHOD OF AND APPARATUS FOR MEASURING TIME INTERVALS

Filed March 29, 1930

INVENTORS:
C. S. Snavely and
H. E. Ashworth,
by A. R. Vermill
Their Attorney

Patented Apr. 21, 1931

1,801,291

UNITED STATES PATENT OFFICE

CLARENCE S. SNAVELY AND HARRY E. ASHWORTH, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA

METHOD OF AND APPARATUS FOR MEASURING TIME INTERVALS

Application filed March 29, 1930. Serial No. 439,937.

Our invention relates to the measurement of time intervals, and has for its object the provision of novel and improved means and methods for measuring and recording the interval of time between consecutive events, as well as a novel and improved alternating current cycle recorder for use in connection with such means and methods.

We will describe one form of apparatus and method embodying our invention, and will then point out the novel features thereof in claims.

Figure 1:
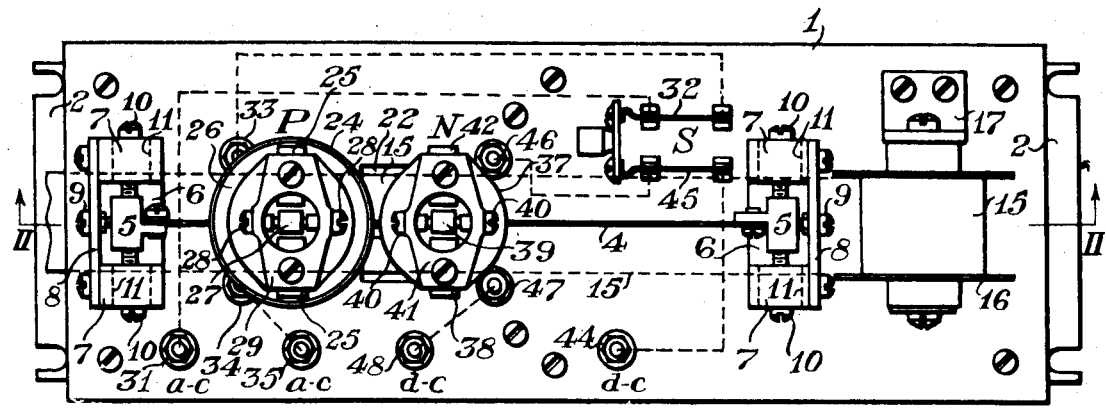
Figure 2:
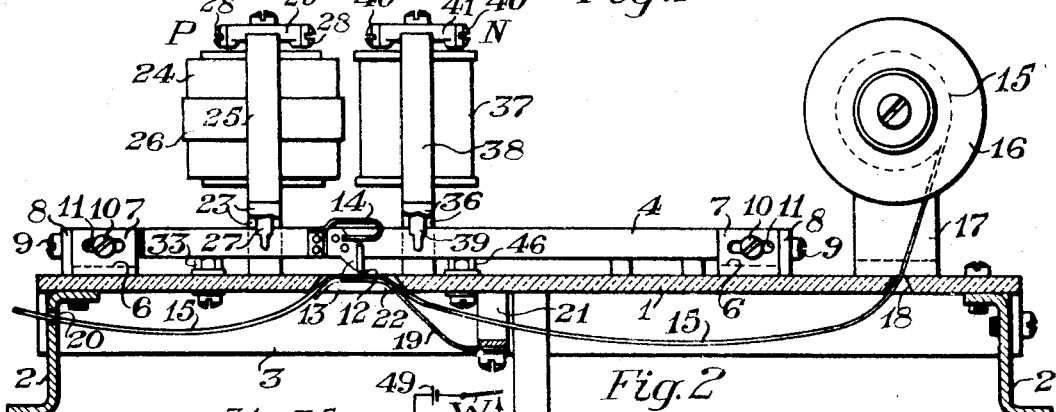
Figure 3:
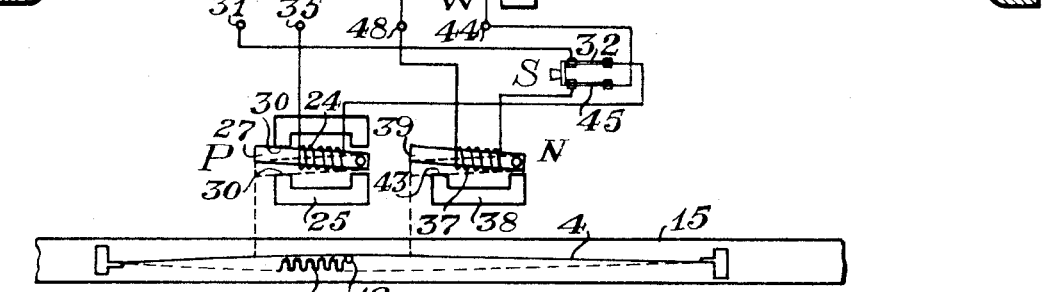
Figures 4, 5:
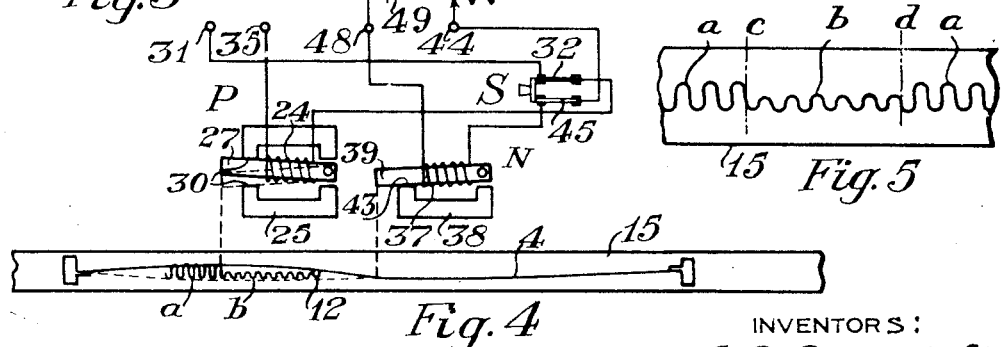

In the accompanying drawing, Fig. 1 is a plan view of one form of apparatus constructed in accordance with our invention. Fig. 2 is a view partly in side elevation and partly in vertical longitudinal section taken substantially on line II—II of Fig. 1. Fig. 3 is a diagrammatic view of the apparatus illustrating the position of the parts when recording oscillations of maximum amplitude. Fig. 4 is a diagrammatic view of the apparatus illustrating the position of the parts when recording damped oscillations. Fig. 5 is an enlarged fragmentary view of a record strip having a chronographic record of both damped and undamped oscillations indicated thereon.

Similar reference characters refer to similar parts in each of the several views.

Referring to the drawing, a cycle recorder constructed in accordance with our invention is shown as comprising a base plate or table 1 of suitable insulating material which is mounted at each end on legs 2 of Z-bar construction and which is reenforced along its longitudinal edges by depending flanges 3 secured at their ends to the legs 2. A laterally flexible leaf spring 4 extends longitudinally of the base plate 1 and is supported at each end in spaced relation therewith by a floating block 5. The blocks 5 are mounted for longitudinal and transverse adjustment on blocks 6 which are secured to the base plate 1 and which are each formed with spaced lugs 7 and a transversely extending bar 8. A screw 9 extends through each of the bars 8 with the head thereof in abutting engagement therewith and is threaded into the associated block 5. These screws are employed to provide the necessary tension on the spring 4. The lateral position of the spring 4 may be adjusted by means of screws 10 which extend through slots 11 formed in the lugs 7 and are threaded into the opposite sides of the blocks 5. A vertically extending stylus 12 is slidably mounted in a holder 13 carried by the spring 4 intermediate its ends and is biased downwardly by a spring 14 also carried by the spring 4.

A record strip 15, preferably of paper, is wound upon a spool 16 which is rotatably mounted on a bracket 17 carried by the base plate 1 and a portion of this strip is threaded downwardly through a slot 18 formed in the base plate 1 at one end thereof, thence longitudinally beneath the base plate, and over a platen 19, and thence through a slot 20 provided in the leg 2 at the other end of the apparatus. The platen 19 is carried by a bracket 21 secured to the underside of the base plate 1 and yieldably supports the record strip 15 within an aperture or window 22 provided in the base plate 1 and in a position where it will be engaged by the stylus 12.

A polarized relay, designated in its entirety by the reference character P, is mounted on non-magnetic legs 23 secured to the base plate 1 and comprises a winding 24, a two-part core 25, a permanent magnet 26, and an armature 27. The armature 27 is pivotally mounted at its upper end between screws 28 threaded in a non-magnetic bearing bracket 29 carried by the core 25 and extends downwardly through the winding for oscillatory movement between the pole faces 30 of the core 25 when the winding is energized by alternating current, as will hereinafter be described.

Alternating current is supplied to the polarized relay P through a circuit which includes a terminal post 31, an arm 32 of a manually operable knife switch S mounted on the base plate, 1 terminal 33 of relay P, winding 24 and terminal 34 of relay P to terminal post 35. The terminal posts 31 and 35 are carried by the base plate 1 and are adapted to be connected with a suitable source of alternating current, not shown in the drawing. The lower end of the armature 27 is slotted for engagement with the spring 4 so that when the relay P is energized, the oscillation of the armature will be transmitted to the spring 4 and cause it, and the stylus 12 carried thereby, to vibrate in a direction transverse to the movement of the record strip 15.

A neutral relay, designated in its entirety by the reference character N, having non-magnetic supporting legs 36, is also mounted on the base plate 1 and comprises a winding 37, a single core member 38 and an armature 39. The armature 39 is pivotally mounted at its upper end between screws 40 threaded into a non-magnetic bearing bracket 41 which is secured to the upper end of the core 38 and a non-magnetic leg 42 and extends downwardly through the winding 37 for movement toward the pole face 43 of the core 38 when the winding 37 is energized by direct current, as will hereinafter be described.

Direct current is supplied to the neutral relay N through a circuit which includes a terminal post 44, an arm 45 of switch S, terminal 46 of relay N, winding 37, and terminal 47 of relay N to terminal post 48. The terminal posts 44 and 48 are also carried by the base plate 1 for connection with a suitable source of direct current. The lower end of the armature 39 is also slotted for engagement with the spring 4 so that when the relay N is energized, as shown in Fig. 4, it will prevent the spring from vibrating between the armature 39 and its point of attachment to the right-hand end of the base plate, as viewed in the drawing, but when the neutral relay N is deenergized, the spring 4 is free to vibrate throughout its entire length, as shown in Fig. 3. It will therefore be obvious that the amplitude of vibration of the spring 4 may be varied by energizing and deenergizing the relay N. The parts are so proportioned that if both of the relays P and N are deenergized and the screws 9 and 10 are properly adjusted, the tension on the spring 4 will hold the armatures 27 and 39 out of engagement with the pole faces of the core members 25 and 38 and uniformly spaced in the air gaps therebetween.

In Figs. 3 and 4, we have diagrammatically illustrated, for the purpose of example, the manner in which the apparatus may be employed to determine the time interval during which a switch W is closed. We will assume that a source of alternating current of 60 cycle frequency is connected across the terminal posts 31 and 35 and that direct current from a battery 49 is connected across the terminal posts 44 and 48 through the switch W. If the switch W is open and the switch S is closed, the polarized relay P only, will become energized by alternating current and cause the vibration of the spring 4 throughout its entire length; the neutral relay N, being deenergized, permits its armature 39 to follow the vibrations of the spring without materially altering the amplitude thereof. If the record strip 15 is now drawn longitudinally beneath the stylus 12, the stylus will trace upon the strip a line of substantially sine wave form and of comparatively large magnitude. This line may be similar to the line $a$ shown in Figs. 3, 4 and 5, dependent of course, upon the rapidity and uniformity of movement of the record strip 15. If the switch W is now closed, the neutral relay N will become energized by direct current supplied to its winding 37 from the battery 49 and will hold its armature 39 in engagement with the pole face 43 of its core 38, as shown in Fig. 4. This will shorten the effective length of the spring 4 and reduce the effective radius of oscillation of the stylus, and hence will damp the vibrations of the spring caused by the periodic operation of the polarized relay P. As a result, the amplitude of the wave indicated on the record strip 15 will be decreased and appear as indicated by the line $b$ in Figs. 4 and 5. If the switch W is now opened, the neutral relay N will become deenergized as before and the apparatus will again indicate an approximate sine wave $a$ of maximum amplitude. Inasmuch as the alternating current energizing the polarized relay is of 60 cycle frequency, it follows that the number of cycles in the recorded wave $b$ of decreased amplitude appearing on the record strip indicates the length of time that the switch W was closed, each complete wave representing one complete cycle of alternating current, or one-sixtieth of a second in time. For example, we will assume that during the interval of time that the switch W was closed, six damped oscillations of the armature 27 were recorded on the record strip 15, as indicated by the sine waves $b$ located between the points $c$ and $d$ in Fig. 5. This signifies that the polarized relay P was energized by six complete cycles of alternating current during the time that its circuit was closed, or, in other words, that the switch W was closed for one-tenth of a second. Obviously, the speed of the record strip need not be considered in determining the time during which the switch W was closed, it being only necessary that the strip be moved with sufficient rapidity to render the several curves distinguishable one from another. Moreover, while we have shown and described our invention as being employed to determine the time that a switch is closed; it will be apparent that the apparatus may be employed with a normally closed circuit for determining the time interval that a switch is open. In such case the time is determined from the number of cycles of maximum amplitude appearing on the record strip between two trains of cycles of damped or decreased amplitude. Furthermore, the apparatus is not limited in its use to determining the time interval that a switch is open or closed as described above, as it may be employed for determining the time interval between the beginning and termination of other events or between the termination of one event and the beginning of another event.

Although we have herein shown and described only one form of apparatus embodying our invention, and one method of using such apparatus, it is understood that various changes and modifications may be made therein within the scope of the appended claims without departing from the spirit and scope of our invention.

Having thus described our invention, what we claim is:

1. The method of measuring the time interval between two events which comprises causing a member to oscillate at a predetermined frequency, varying the amplitude of the oscillations at the beginning and termination of an event, and recording the number of oscillations between such variations.

2. The method of measuring the time interval between two events which comprises causing a member to oscillate at a predetermined frequency, decreasing the amplitude of the oscillations during the interval between such events, and recording the number of oscillations of decreased amplitude.

3. Apparatus for measuring a time interval comprising an indicating member, means for oscillating said member at a predetermined frequency, means for varying the amplitude of oscillation of said member at the beginning and termination of such time interval, and means for recording the oscillations of said member.

4. Apparatus for measuring a time interval comprising an indicating member, means for oscillating said member at a predetermined frequency, means for varying the amplitude of the oscillations of said member during such time interval, and means for recording the oscillations of said member.

5. Apparatus for measuring a time interval comprising an indicating member, means for oscillating said member at a predetermined frequency, means for decreasing the amplitude of oscillation of said member during such time interval, and means for recording the oscillations of said member.

6. Apparatus for measuring a time interval comprising a member adapted to produce visible indications upon a moving record receiving surface, means for vibrating said member at a predetermined frequency, and means for damping the vibrations of said member during such time interval.

7. Apparatus for measuring a time interval comprising a flexible member adapted to produce visible indications upon a moving record receiving surface, a polarized relay for vibrating said member at a predetermined frequency, and an electromagnet for damping the vibrations of said member during such time interval.

8. Apparatus for measuring a time interval comprising a member adapted to produce visible indications upon a moving record receiving surface, a polarized relay operating when supplied with alternating current to vibrate said member at the frequency of the current supplied to said relay, an electromagnet for damping the vibrations of said member, and a contact device for controlling the energization of said electromagnet and adapted to be operated at the beginning and termination of such time interval.

9. Apparatus for measuring a time interval comprising a flexible member adapted to produce visible indications upon a moving record receiving surface, means for periodically flexing said member at a predetermined frequency, and means for controlling the degree of flexure of said member during the occurrence of such time interval.

10. Apparatus for measuring a time interval comprising a movable record receiving surface, a flexible elongated member suspended under tension adjacent said surface, means operated by said member for producing visible indications upon said surface, a polarized relay having the armature thereof operatively connected with said member intermediate the extremities thereof for periodically flexing said member at a predetermined frequency, and means for limiting the degree of flexure of said member during such time interval.

11. Apparatus for measuring a time interval comprising a movable record receiving surface, a flexible elongated member suspended under tension adjacent said surface, means operated by said member for producing visible indications upon said surface, a polarized relay having the armature thereof operatively connected with said member intermediate the extremities thereof for periodically flexing said member at a predetermined cyclic frequency, means for limiting the degree of flexure of said member during said time interval, and means for adjusting the tension of said member.

12. Apparatus for measuring a time interval comprising a movable record receiving surface, a flexible elongated member supported under tension adjacent said surface, means operated by said member for producing visible indications upon said surface, a polarized relay having the armature thereof operatively connected with said member intermediate the extremities thereof for periodically flexing said member at a predetermined frequency, means for limiting the degree of flexure of said member during said time interval, and means for adjusting the position of said member transversely of the air gaps of said relay.

13. Apparatus for measuring a time interval comprising a flat spring suspended under tension between a pair of supports, means carried by said spring intermediate its extremities for producing visible indications upon a movable record receiving surface, a polarized relay having the armature thereof connected with said spring intermediate the extremities thereof for periodically flexing said spring at a predetermined frequency, and an electromagnet having the armature thereof connected with said spring and adapted to be energized throughout said time interval to limit the degree of flexing of said spring and to thereby alter the character of said indications.

14. Apparatus for measuring a time interval comprising a movable record receiving surface, a member adapted to be oscillated at a predetermined frequency, means operable by said member for indicating the oscillation thereof on said surface, and means operating during such time interval for varying the effective radius of oscillation of said member.

15. Apparatus for measuring a time interval comprising a movable record receiving surface, a stylus cooperating with said surface, vibrating means movable between fixed points for oscillating said stylus, and means operating during such time interval for varying the effective radius of oscillation of said stylus independently of the movement of said vibrating means.

In testimony whereof we affix our signatures.

CLARENCE S. SNAVELY.
HARRY E. ASHWORTH.